US011086698B1

(12) United States Patent
Nitsopoulos

(10) Patent No.: US 11,086,698 B1
(45) Date of Patent: Aug. 10, 2021

(54) SYSTEMS AND METHODS FOR DEVELOPING DIGITAL EXPERIENCE APPLICATIONS

(71) Applicant: PNC Financial Services Group, Inc., Pittsburgh, PA (US)

(72) Inventor: Michael Nitsopoulos, Pittsburgh, PA (US)

(73) Assignee: PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 17/066,560

(22) Filed: Oct. 9, 2020

Related U.S. Application Data

(63) Continuation of application No. 17/010,074, filed on Sep. 2, 2020.

(60) Provisional application No. 62/983,529, filed on Feb. 28, 2020.

(51) Int. Cl.
*G06F 9/54* (2006.01)
*G06F 9/448* (2018.01)
*G06Q 40/02* (2012.01)

(52) U.S. Cl.
CPC ............ *G06F 9/542* (2013.01); *G06F 9/4484* (2018.02); *G06F 9/546* (2013.01); *G06Q 40/02* (2013.01)

(58) Field of Classification Search
None
See application file for complete search history.

(56) References Cited

U.S. PATENT DOCUMENTS

| 2012/0278736 | A1 | 11/2012 | Tran et al. | |
| 2013/0325960 | A1* | 12/2013 | Agarwal | H04L 67/02 709/204 |
| 2016/0140338 | A1* | 5/2016 | Walters | G06F 21/31 726/22 |
| 2018/0032627 | A1* | 2/2018 | Margatan | H04L 67/10 |
| 2018/0197143 | A1 | 7/2018 | Daub et al. | |
| 2019/0065177 | A1 | 2/2019 | Khoongumjorn et al. | |
| 2019/0165950 | A1 | 5/2019 | Ibrahim | |
| 2020/0133982 | A1* | 4/2020 | Thangeswaran | H04L 67/02 |

* cited by examiner

*Primary Examiner* — Charles E Anya
(74) *Attorney, Agent, or Firm* — Finnegan, Henderson, Farabow, Garrett & Dunner, LLP

(57) ABSTRACT

In one implementation, systems and methods are provided for developing a computer-implemented digital experience application having a first and a second micro-application. Each micro-application includes a front end interface configured to receive and display information. The first micro-application includes a first event manager configured to detect an application event belonging to a category, and a first state manager configured to detect an application state belonging to the category. The digital experience application further includes a driver application configured to host the first and second micro-applications, an event hub configured to receive the detected application event from the first micro-application, and a state store configured to store the detected application state received from the first micro-application. The second micro-application includes a second event manager configured to receive the detected application event from the event hub, and a second state manager configured to receive the detected application state from the state store.

20 Claims, 15 Drawing Sheets

SYSTEMS AND METHODS FOR DEVELOPING DIGITAL EXPERIENCE APPLICATIONS

CROSS REFERENCE TO RELATED APPLICATIONS

This application is a continuation of U.S. patent application Ser. No. 17/010,074, filed on Sep. 2, 2020, which claims priority to U.S. Provisional Patent Application No. 62/983,529, filed on Feb. 28, 2020, the entire contents of which are incorporated herein by reference.

The present application incorporates by reference Provisional U.S. Patent Application Ser. No. 62/983,535, filed Feb. 28, 2020, and Provisional U.S. Application Ser. No. 62/983,581, filed Feb. 29, 2020. The patent applications cited herein are incorporated by reference in their entireties, except for any definitions, subject matter disclaimers or disavowals, and except to the extent that the incorporated material is inconsistent with the express disclosure herein, in which case the language in this disclosure controls.

TECHNICAL FIELD

The present disclosure relates generally to computer-implemented systems and methods for developing digital experience applications. More specifically, and without limitation, this disclosure relates to computer-implemented systems and methods for developing digital applications using one or more discrete micro-applications.

BACKGROUND

In digital application systems, it is often desirable to build functionality in small, discrete pieces commonly referred to as "micro-applications" or "MicroApps." Micro-applications allow digital application developers to work independently from one another on separate features and functions. They also allow developers to avoid re-writing code for the same tasks when developing new applications. Existing systems and methods for developing micro-applications, however, suffer from a number of drawbacks. For example, existing systems and methods are unable to standardize the communication pattern between micro-applications. This requires developers to write specific code, often for two or more micro-applications, so that the micro-applications can share information. In addition, existing systems and methods are inefficient because micro-applications are coupled through dependencies, resulting in micro-applications that are not self-reliant but rather rely on functions and outputs from other applications or micro-applications. Furthermore, existing systems and methods are cumbersome to use by developers, leading to degradation of code quality.

Accordingly, there is a need to overcome these and other drawbacks of existing systems and for improved systems and methods for developing digital experience applications.

SUMMARY

In view of the foregoing, embodiments of the present disclosure address disadvantages of existing systems by providing novel computer-implemented systems, methods, and techniques for developing digital experience applications.

Embodiments of the present disclosure provide a computer-implemented digital experience application may be developed. The digital experience application may include a driver application that may be configured to host a plurality of micro-applications. The digital experience application may include a first micro-application and a second micro-application. Each micro-application may include a front end interface configured to receive and display information. The first micro-application may include an event manager configured to detect an application event belonging to a category. The first micro-application may further include a state manager configured to detect an application state belonging to the category. The digital experience application may include a driver application configured to host the first and second micro-applications. Digital experience application may include an event hub configured to receive the detected application event from the first micro-application and a state store configured to receive the detected application state from the first micro-application and store the detected application state. The second micro-application may include an event manager configured to receive the detected application event from the event hub, and a state manager configured to receive the detected application state from the state store.

According to embodiments of the present disclosure, the event hub may be configured to receive the detected application event in response to a user interaction with the front end interface of the first micro-application.

According to embodiments of the present disclosure, the state store may be configured to receive the detected application state in response to a user interaction with the front end interface of the first micro-application.

According to embodiments of the present disclosure, the second micro-application may be subscribed to receive an application event belonging to the category, and the event hub may be configured to transmit the detected application event to the second micro-application event manager based on the subscription.

According to embodiments of the present disclosure, the second micro-application may be subscribed to receive an application state belonging to the category, and the state store may be configured to transmit the detected application state to the second micro-application state manager based on the subscription.

According to embodiments of the present disclosure, the detected application event may include a source identifier identifying the first micro-application. The second micro-application may be subscribed to receive an application event transmitted from the first micro-application, and the second micro-application event manager may be configured to receive the detected application event from the event hub based on the source identifier.

According to embodiments of the present disclosure, the detected application state may include a source identifier identifying the first micro-application. The second micro-application may be subscribed to receive an application state transmitted from first micro-application, and the second micro-application event manager may be configured to receive the detected application event from the state store based on the source identifier.

According to embodiments of the present disclosure, driver application may comprise an event listener configured to listen for an application event belonging to the category. The event listener may be configured to receive the detected event from the event hub, and the second micro-application event manager may be configured to receive the detected application event from the event hub via the event listener.

According to embodiments of the present disclosure, the driver application may be configured to load, in response to the event listener receiving the detected event, a third micro-application. The third micro-application may comprise a third micro-application state manager configured to receive the detected application state from the state store.

According to embodiments of the present disclosure, the digital experience application comprises a single page application.

According to embodiments of the present disclosure, the digital experience application may comprise a page component configured to position the first micro-application at a first position within the application and position the second micro-application at a second position within the application.

According to embodiments of the present disclosure, the digital experience application may comprise an error handler configured to detect an error condition in at least one of first micro-application and second micro-application.

According to embodiments of the present disclosure, the first micro-application may comprise an outer interface configured to exchange information with a source of information.

According to embodiments of the present disclosure, the first micro-application may comprise a front end interface and an outer interface that are deployed as a separate docker container.

Embodiments of the present disclosure provide a computer-implemented method for providing a digital experience. The method may comprise operations performed by at least one processor. The operations may comprise detecting, at an event manager of a first micro-application, an application event belonging to a category. The method may comprise detecting, at a state manager of the first micro-application, an application state belonging to the category. The method may comprise receiving, at an event hub, the detected application event from the event manager of the first micro-application. The method may comprise receiving, at a state store, the detected application state from the state manager of the first micro-application. The method may comprise storing, at the state store, the detected application state. The method may comprise receiving, at an event manager of a second micro-application, the detected application event from the event hub. The method may comprise receiving, at a state manager of the second micro-application, the detected application state from the state store.

According to embodiments of the present disclosure, the computer-implemented method for providing a digital experience may further comprise determining whether the second micro-application is subscribed to receive an application event belonging to the category and transmitting, based on the determination, the detected application event to the second micro-application event manager.

According to embodiments of the present disclosure, the computer-implemented method for providing a digital experience may further comprise determining whether the second micro-application is subscribed to receive an application state belonging to the category, and transmitting, based on the determination, the detected application state to the second micro-application state manager.

According to embodiments of the present disclosure, the computer-implemented method for providing a digital experience may further comprise determining whether the second micro-application is subscribed to receive an application state belonging to the category, and transmitting, based on the determination, the detected application state to the second micro-application state manager.

Embodiments of the present disclosure provide a tangible, non-transitory computer-readable memory device that stores a set of instructions. The set of instructions, when executed by at least one processor, cause the at least one processor to perform operations. The operations may comprise detecting, at an event manager of a first micro-application, an application event belonging to a category. The operations may comprise detecting, at a state manager of the first micro-application, an application state belonging to the category. The operations may comprise receiving, at an event hub, the detected application event from the event manager of the first micro-application. The operations may comprise receiving, at a state store, the detected application state from the state manager of the first micro-application. The operations may comprise storing, at the state store, the detected application state. The operations may comprise receiving, at an event manager of a second micro-application, the detected application event from the event hub. The operations may comprise receiving, at a state manager of the second micro-application, the detected application state from the state store.

The systems and methods disclosed herein may be used in various applications and vision systems, such as business systems and systems that benefit from building functionality using small, discrete pieces.

It is to be understood that the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting.

Disclosed embodiments provide a standardized communication pattern between micro-applications that is not dependent on the environment. Disclosed embodiments use application states, rather than dependencies, to create micro-applications that are loosely coupled, resulting in micro-applications that can be more easily integrated into new systems. Disclosed embodiments provide a simple and elegant set of utilities that are integrated into the development process to help developers maintain high code quality and adhere to the same development techniques.

Digital Experience Application Comprising a Collection of Micro-Applications

Figure 1:
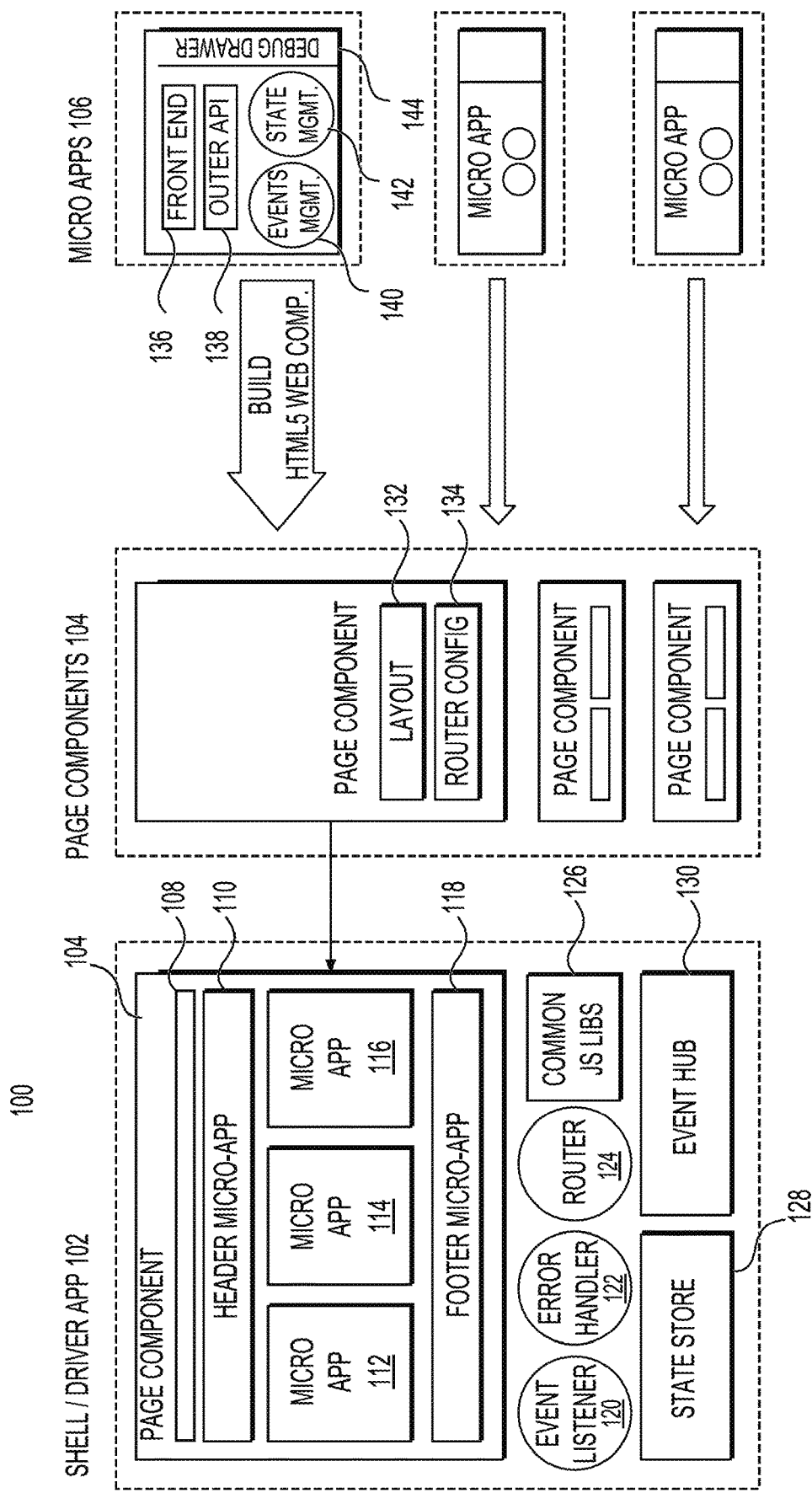
FIG. 1 is a schematic representation of an exemplary computer-implemented digital experience application comprising a plurality of micro-applications, according to embodiments of the present disclosure.

FIG. 1 is a schematic representation of an exemplary computer-implemented digital experience application 100. In accordance with disclosed embodiments, digital experience application 100 may comprise a plurality of micro-applications 106 configured to detect events relating to the application 100 (i.e., application events) and states relating to the application 100 (i.e., application states). The digital experience application 100 may include one or more driver applications 102 for hosting and managing the plurality of micro-applications 106. A driver application 102, also referred to as a "channel application," can include one or more page components 104 configured to lay out and route information to and from the plurality of micro-applications 106. The driver application 102 may also include one or more event hubs 130 configured to receive the detected application events from the plurality of micro-applications 106 and route the detected application events to the plurality of micro-applications 106 and/or other components of application 100. Driver application 102 may also include one or more state stores 128 configured to store the detected application states received from the plurality of micro-applications.

In some embodiment, the digital experience application 100 may comprise one or more event listeners 120 configured to respond when an event occurs in the plurality of micro-applications 106; one or more error handlers 122 configured to respond to error conditions in the plurality of micro-applications 106; one or more routers 124 configured to forward information received from the plurality of micro-applications 106; and one or more common libraries 126 comprising resources and/or functions used by the plurality of micro-applications 106. In various embodiments, the driver application 102 can be configured to provide information to the page component 104 for ensuring that the plurality of micro-applications 106 function and are displayed in a similar manner. For example, the driver application 102 can provide, to the page component 104, information corresponding to a common style scheme, which may include information relating to font styles, font size, buttons, links, and the like. In some embodiments, the information may relate to features for backwards compatibility, for example to provide backwards compatibility with older web browsers for displaying the application 100. This may include polyfill code or the like to allow developers to use an interface or feature of application 100 whether it is supported by a browser or not.

Figure 3:
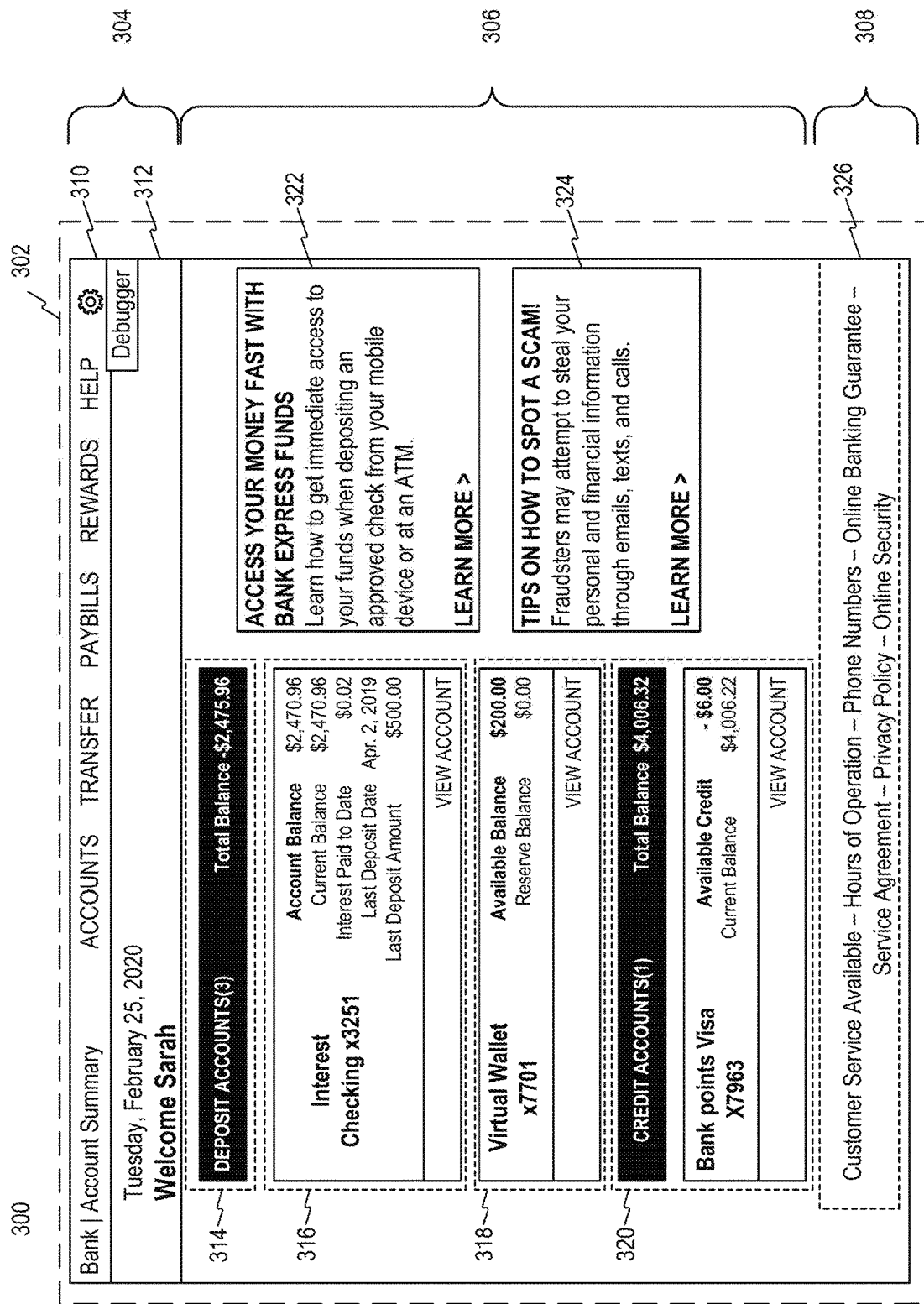
FIG. 3 is a schematic representation of an exemplary digital experience application according to embodiments of the present disclosure.

A page component 104 may include router configuration information 134 so that page component 104 may be configured to represent or act as a route in the driver application 102 and host a micro-application 106 corresponding to that route. For example, if a user interacts with a micro-application 106, the page component 104 may be configured to send data corresponding to that user interaction to the driver application 102. As another example, a user may interact with a micro-application on a first page component which may act as a route to send data corresponding to that user interaction to a second page component (enabling page routing). A page component 104 may include layout 132 providing information configured to specify the layout of the micro-application 106. To illustrate using FIG. 1 as an example, layout 132 may include information such that page component 104 may be configured to position a first micro-application 106 at the top of the page component 104, corresponding to a navigation bar micro-application 108 in this example (e.g., a micro-application configured to navigate from the page component as shown in FIG. 3); position a second micro-application, corresponding to a header micro-application 110 in this example, below the first micro-application 108 (e.g., a header micro-application containing a welcome banner as shown in FIG. 3); position a third micro-application, corresponding to a footer micro-application 118 in this example, at the bottom of the page component 104 (e.g., a footer micro-application containing data of a business or copyright information as shown in FIG. 3); and position fourth, fifth, and sixth micro-applications (112, 114, 116) between the header micro-application 110 and footer micro-application 118 (e.g., a deposit account summary micro-application for displaying to a user all deposit accounts related to the user as shown in FIG. 3).

In some embodiments, driver application 102 aggregates a plurality of micro-applications 106 to develop the user experience of the application 100. This framework enables application developers to build applications, such as application 100, using small, discrete pieces (i.e., the micro-applications). In some embodiments, the driver application 102 comprises a Single Page Application (SPA), which may be developed, for example, using the Angular platform. A micro-application 106 can be configured to perform one or more discrete functions, for example using functional logic. The micro-application 106 may represent an independent vertical slice of the business functionality provided by the application 100. The micro-application 106 can comprise a front-end 136, (i.e. a user interface, such as a graphical user interface or "GUI") configured to interface with a user by receiving input information from the user and/or providing information to the user. For example, a micro-application 106 may contain a front-end 136 for receiving user input in the form of a mouse-click on a browser, interaction with a button, touch screen, touch panel, keyboard input, or the like. Front end 136 may also provide information to the user through a display or the like. The front-end 136 of the micro-application 106 may be created using a front-end web platform for building mobile and desktop web applications, such as the Angular platform. In some embodiments, as shown in FIG. 1, micro-application 106 may be loaded onto the page component 104 and to the driver application 102 using a web platform such as HTML5 web component technology or the like.

In some embodiments, the micro-application 106 may comprise an outer interface 138 (also referred to as a back end) corresponding to the front end 136 of the micro-application 106. The outer interface 138 may be configured for receiving information from and sending information to a component or source outside the driver application 102. For example, the outer interface 138 may be configured for receiving information from a database. In some embodiments, the outer interface 138 may be an application programming interface (API). The outer interface 138 may route information to and from an Inner API, as disclosed in Provisional U.S. Patent Application Ser. No. 62/983,535, the contents of which are incorporated herein. The micro-application 106 may contain an outer interface 138 developed using spring boot or Bootstrap framework. In some embodiments, the front-end 136 and the outer interface 138 of a micro-application 106 may be deployed as a separate container, such as a docker container, in a container application, such as OpenShift Container Platform (OCP), or the like. This enables the micro-application 106 to run quickly and reliably from one computing environment to another.

In some embodiments, the micro-application 106 can further comprise an event manager 140 configured to send and receive event information. For example, event manager 140 may be configured to detect an application event belonging to a category and transmitting the detected application event. The detected application event may be transmitted to event hub 130, for example. The micro-application 106 can further comprise a state manager 142 configured to send and receive state information. For example, state manager 142 may be configured to detect an application state belonging to a category and transmitting the detected application state. The detected application event may be transmitted to state store 128, for example, for storage. In some embodiments, the micro-application can further comprise a debug drawer 144 configured to capture and replay events as a part of the micro-application communication.

In some embodiments, a micro-application 106 may not include an outer interface 138. Here, a micro-application 106 without an outer interface 138 may be configured to listen for events and state changes from other micro-applications. For example, a first micro-application may send event information to event hub 130 and state information to state store 128. A second micro-application configured to listen for events and state changes from first micro-application, or alternatively, the events and state changes belonging to a specific category, may then receive the event information from event hub 130 and state information from state store 128.

Event hub 130 can be configured to route event information to and from the plurality of micro-applications 106 and/or the driver application 102. The plurality of micro-applications 106 and/or the driver application 102 can be configured to transmit or receive event information to and/or from the event hub 130 as a result of or in response to a user input or other user interaction with micro-applications 106. Alternatively or additionally, the plurality of micro-applications 106 and/or the driver application 102 may be configured to transmit or receive event information to and/or from the event hub 130 as a background process. Accordingly, micro-applications 106 and/or the driver application 102 may publish events in response to either a user interaction or a background process. In some embodiments, event hub 130 may be integrated into the driver application 102. The event hub 130 may be configured to route information based on one or more criteria. For example, the event hub 130 may be configured to route event information from a first source to a first set of micro-applications, and it may be configured to route event information from a second source to a second set of micro-applications. The event hub 130 may route or filter the event information from the first and second sources using a source identification value emitted by the source.

In some embodiments, micro-applications 106 and/or driver application 102 may "subscribe" to receiving event information. For example, micro-applications 106 and/or driver application 102 may be subscribed to receiving event information from a specific source. In this case, the event hub 130 may be configured to route event information only to micro-applications 106 or driver application 102 subscribed to receiving information from the specific source before the event occurs. In some embodiments, a micro-application 106 or driver application 102 may be late in subscribing to receive the event information from the source before the event occurs. In this case, the micro-application 106 or driver application 102 that subscribes late does not receive the event information. In some embodiments, the event hub 130 may be configured to route "special" event information differently, such as for navigating the driver application 102 to a different page, as described in further detail below. In some embodiments, the event hub 130 can be configured to be a singleton, such that only a single instance of the event information is relayed. In this manner, the system can ensure that only correct and up-to-date event information is transmitted.

In some embodiments, state store 128 may be integrated into the driver application 102. State store 128 can be configured to store state information relating to application 100. The state store 128 may comprise a database, server, local storage, or the like. For example, state store 128 may comprise in-browser memory, with state information being stored as an object, such as a JavaScript Object Notation (JSON) object. The state store 128 can be further configured to route state information to and/or from the plurality of micro-applications 106 and/or the driver application 102.

The plurality of micro-applications 106 and/or the driver application 102 can be configured to transmit or receive state information to and/or from the state store 128 as a result of or in response to a user input or other user interaction with micro-applications 106. Alternatively or additionally, the plurality of micro-applications 106 and/or the driver application 102 may be configured to transmit or receive state information to and/or from the state store 128 as a background process. Accordingly, micro-applications 106 and/or driver application 102 may update the application state of application 100.

In some embodiments, similar to the event hub 130 described above, state store 128 can be further configured to route state information based on one or more criteria. For example, the state store 128 may be configured to route state information from a first source to a first set of micro-applications, and may route state information from a second source to a second set of micro-applications. The state store 128 may route the state information from the first and second sources using a source identification value emitted by the source. In some embodiments, micro-applications 106 and/or driver application 102 may "subscribe" to receiving state information. For example, micro-applications 106 and/or driver application 102 may be subscribed to receiving state information from a specific source. In this case, the state store 128 may be configured to send state information only to micro-applications 106 or driver application 102 subscribed to receiving state information from the specific source before the state changes. In some embodiments, a micro-application 106 or driver application 102 may be late in subscribing to receive the state information from the source. In this case, the micro-application 106 or driver application 102 that subscribes late does not receive the state information. In some embodiments, the state store 128 can be configured to be a singleton, such that only a single instance of the state information is relayed. In this manner, the system can ensure that only correct and up-to-date state information is transmitted, as the state store 128 acts as the single source of truth. In various embodiments, the state store 128 can be configured to automatically transmit state information to new micro-applications 106 that are added to the driver application 102 and/or the digital experience application 100.

Driver Application for Hosting Micro-Applications

Figure 2:
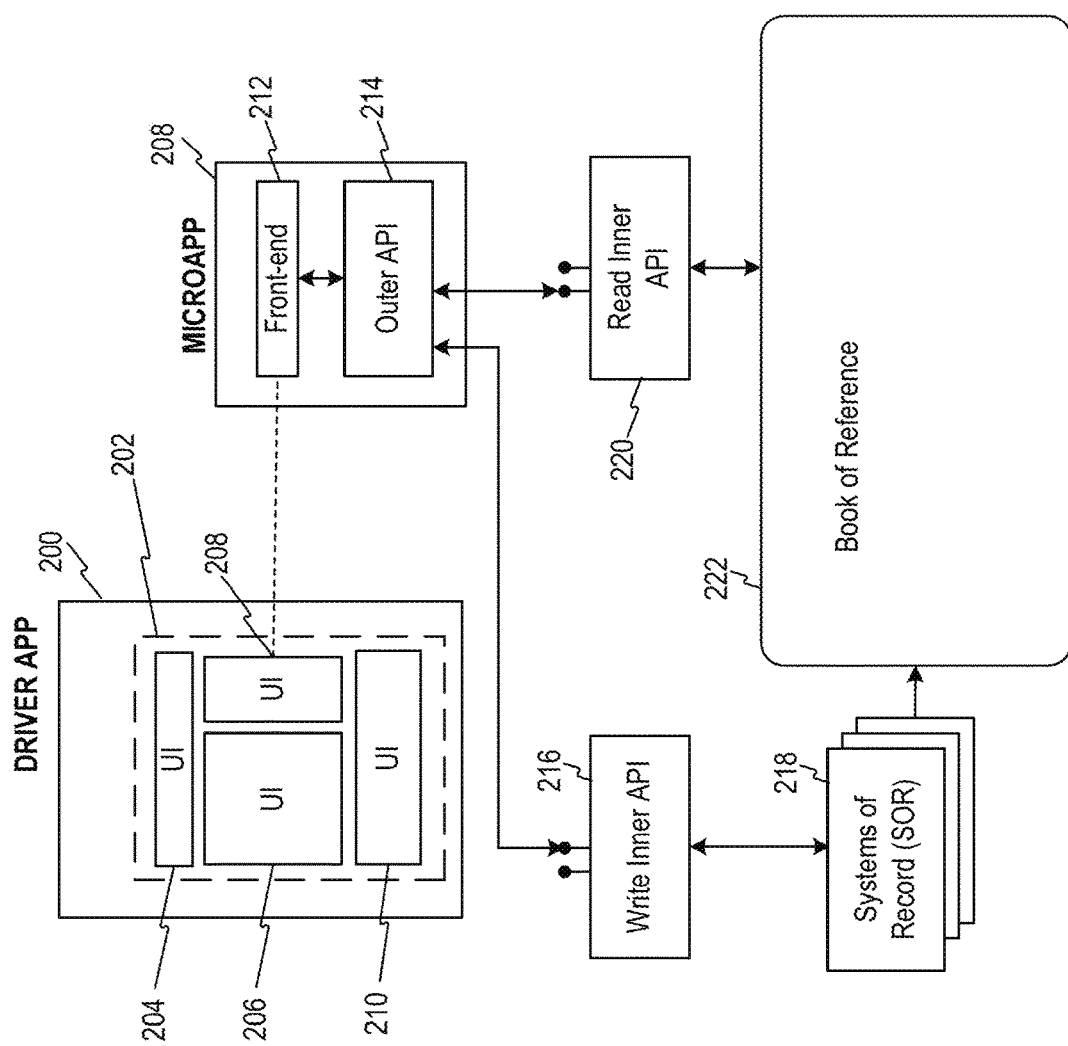
FIG. 2 is a schematic representation of an exemplary driver application hosting a collection of micro-applications according to embodiments of the present disclosure.

FIG. 2 is a schematic representation of an exemplary driver application hosting a collection of micro-applications according to embodiments of the present disclosure. The driver application may be a Single Page Application (SPA) 200, which may be developed, for example, using the Angular platform. SPA may be configured to load a single HTML page and dynamically update that page as the user interacts with the application. SPA 200 includes a page component 202 and hosts micro-applications 204, 206, 208, and 210 to create the user experience of the SPA 200. Micro-application 208 may include a front end 212 configured to interface with a user by receiving input information from the user and/or providing information to the user. Micro-application 208 may further include an outer interface 214 such as an API. Outer API 214 may be configured to interact with components outside of SPA 200, such as a Systems of Record (SOR) 218 via Write Inner API 216, and/or interact with a Book of Reference 222 via Read Inner API 220.

Page Component Providing Layout and Configuration for Micro-Application

FIG. 3 is a schematic representation of an exemplary digital experience application in accordance with some embodiments. Digital experience application 300 may provide a user with a digital experience relating to an application, such as, for example, a financial application for accessing a bank account. For example, a user may interface with digital experience application 300 using a computer, mobile device (e.g., cellular phone, smartphone, tablet, personal digital assistant, etc.), or other electronic device to review and/or interact with a bank account. Application 300 may include a driver application 302, one or more page components (304, 306, 308), and one or more micro-applications (310, 312, 314, 316, 318, 320, 322, 324, 326). Driver application 302 may be configured to host and manage the micro-applications relating to the bank account of a user, such as "Sarah" as illustrated in FIG. 3. Page components 304, 306, and 308 may each include layout and router configuration information, as described above with respect to layout 132 and router configuration information 134, configured to lay out and route information to and from the plurality of micro-applications 310-326. Micro-applications 310-326 may be loaded onto page components 304, 306, and 308 according to layout information in the layout of each page component, as described above.

For example, page component 304 may be configured to position a micro-application, navigation bar micro-application 310, at the top of page component 304. Navigation bar micro-application 310 may be configured to create the page header for application 300 and enable navigation from the page component 304 to other applications or page components. For example, navigation bar micro-application 310 may enable navigation to other page components associated with "accounts," "transfer," "paybills," "rewards," or "help." Page component 304 may be configured to position a micro-application, header micro-application 312, below navigation bar micro-application 310. Header micro-application 312 may be configured to create a personalized welcome banner for an authenticated user, for example, displaying "Welcome Sarah," as illustrated in FIG. 3. Driver application 302 may include another page component 308 configured to position a micro-application, footer micro-application 326, at the bottom of page component 308. Footer micro-application 326 may be configured to provide business and copyright information to the user. For example, footer micro-application 326 may provide bank information relating to customer service hours, contact information, service agreements, privacy policies, and other such information.

Driver application 302 may further include page component 306 configured to position one or more micro-applications between the header micro-application 312 and the footer micro-application 326. For example, page component 306 may be configured to position micro-applications 314, 316, 318 and 320 in a first vertical row on the left hand side of page component 306, and position micro-applications 322 and 324 in a second vertical row on the right hand side of page component 306. Micro-applications 314, 316, 318 may be configured for providing a deposit account summary to create a summary and individualized view of all deposit accounts (e.g., interest checking and virtual wallet) related to a user and/or any associated users, such as associated users of a joint bank account. Micro-application 320 may be configured to provide credit card account summary to create a summary and individualized view of all Credit Card accounts related to the user and/or any associated users. Micro-applications 322 and 324 may be configured for providing tools and tips to the user to present suggestions for bettering the user experience.

The collection of micro-applications 310-326 in application 300 may transmit and receive event information and state information to and from an event hub and a state store, similar to event hub 130 and state store 128 described in FIG. 1. For example, if the user makes a financial transaction, such as a deposit into their checking account, micro-application 316 may detect event information relating to the deposit and detect an update to the state of checking account. The detected event information and updated state may be received by event hub 130 and state store 128, respectively. Additionally, an event listener may be configured to listen for events and state changes from micro-application 316. In response to the detected event information and updated state, event listener may enable the detected event information and updated state to be transmitted from event hub 130 and state store 128 to micro-application 314, for example, to update the total balance information. Here, micro-application 314 may be subscribed to receive event and state information relating to a category, such as deposit account information. Alternatively, micro-application 314 may be subscribed to receive event and state information from a source, such as micro-application 316. In this and other ways, developers may build micro-applications to provide a user experience when accessing application 300.

Event Hub for Routing Event Information

Figure 4:
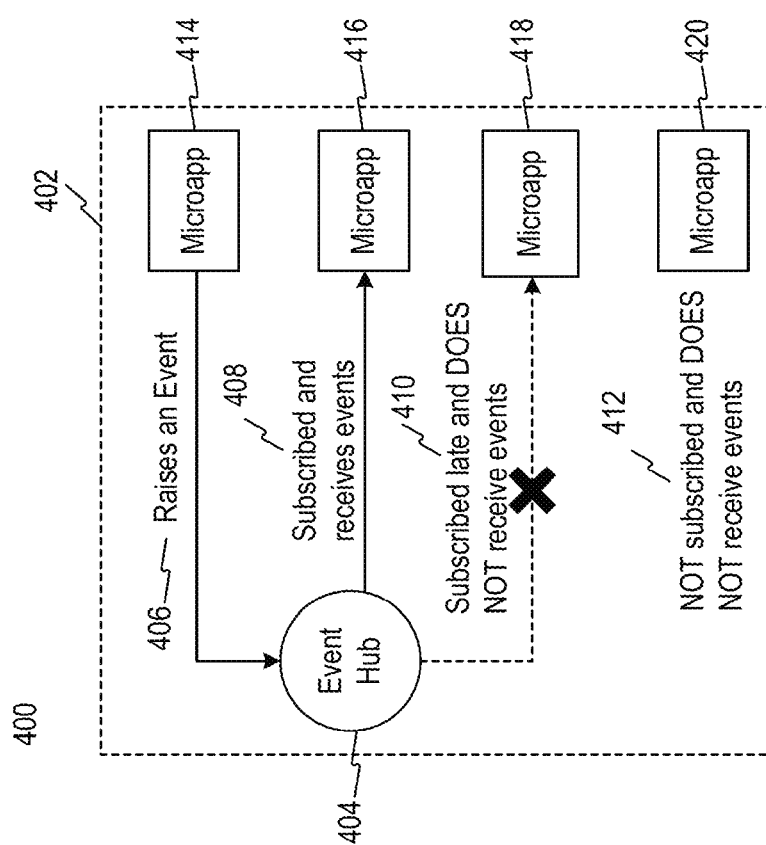
FIG. 4 is a schematic representation of an exemplary computer-implemented event hub for routing event information of a digital experience application, according to embodiments of the present disclosure.

FIG. 4 is a schematic representation of an exemplary computer-implemented event hub for routing event information of a digital experience application, according to embodiments of the present disclosure. Digital experience application 400 may include a driver application 402. Driver application 402 may integrate event hub 404 and host a collection of micro-applications, such as micro-applications 414, 416, 418, and 420. The functional behavior of the micro-applications 414, 416, 418, and 420 may be governed by events, with each micro-application acting as an independent functional unit. In some embodiments, event hub 404 may be configured as a singleton instance such that only a single instance of the event information is relayed. This enables coordinated actions across the system with event hub 404 serving as a communication hub that enables micro-applications 414, 416, 418, 420 and driver application 402 to publish events. Event hub 404 may be configured to receive event information from one or more micro-applications 414, 416, 418, and 420 and then route the received event information to one or more micro-applications 414, 416, 418, and 420 or other components or micro-applications. The event hub 404 may be configured to route event information based on one or more criteria. For example, the criteria may relate to subscriptions, a category of information, or a source of information.

As depicted in FIG. 4, a first micro-application 414 may raise an event at 406, for example, in response to a user interaction or background process. Micro-application 414 may transmit event information for the raised event to the event hub 404. The event information may belong to a category. For example, the event information may belong to a category relating to balances for deposit accounts. Event hub 404 may be configured to determine where to route the event information received from micro-application 414. For example, event hub 404 may be configured to determine if one or more micro-applications have subscribed to receive events. For example, event hub 404 may determine that micro-application 416 is subscribed to receive events belonging to the category of event information received from micro-application 414. For example, event hub 404 may consult a data storage component, such as a lookup table or other memory structure, to determine whether subscriptions exist. Alternatively or additionally, event hub 404 may determine that micro-application 416 is subscribed to receive events raised from a particular source, such as micro-application 414. At 408, event hub 404 determines that micro-application 416 is subscribed to receive events, for example, belonging to a category relating to balances for deposit accounts. In response, event hub 404 routes the event information received from micro-application 414 to micro-application 416. In some instances, event hub 404 may route the event information based on a source identification value emitted by micro-application 414. For example, event hub 404 may determine that micro-application 416 is subscribed to events raised by micro-application 414. Here, event hub 404 routes the event information to micro-application 416 using the source identification value emitted by micro-application 414.

In some instances, a micro-application may not be subscribed to receive events. For example, micro-application 420 is not subscribed to receive events and will not, at 408, receive events from event hub 404. In some instances, a micro-application 418 may have subscribed late, for example, after the event has already been raised by micro-application 414, and may not receive events, at 410, from event hub 404. In some embodiments, a driver application, such as driver application 402, may be subscribed to receive event information from a micro-application in the same manner as subscribed micro-application 416, as described above. In this instance, event hub 404 determines that driver application 402 is subscribed to receive event information from micro-application 414, and transmits the event information received to driver application 402.

Figure 5:
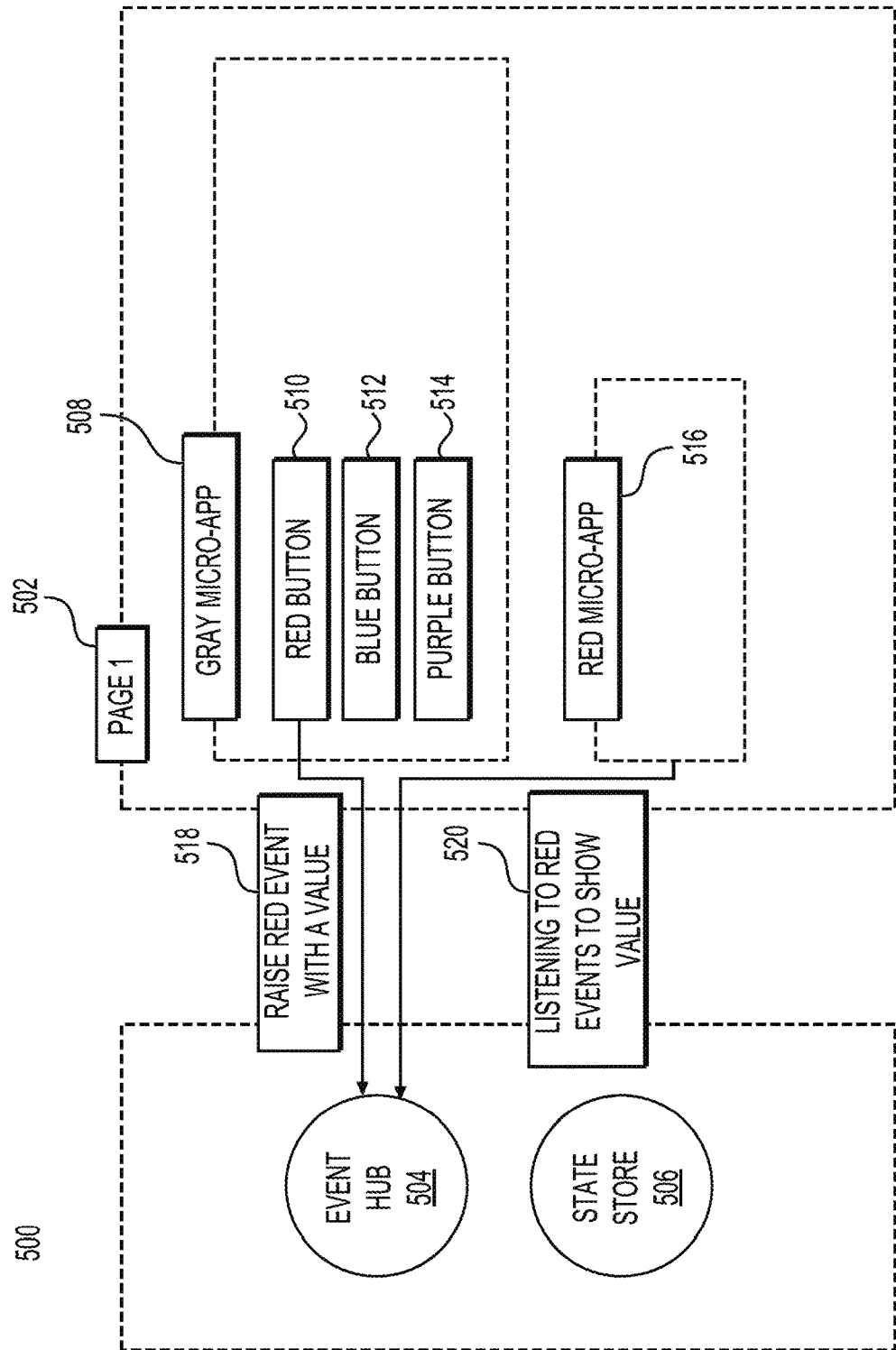
FIG. 5 is a schematic representation of an exemplary embodiment depicting an event hub enabling communication between micro-applications to share event information according to embodiments of the present disclosure.

Micro-applications may publish events in response to a user interaction or a background process. For example, FIG. 5 is a schematic representation of an exemplary embodiment depicting an event hub enabling communication between micro-applications to share event information. Application 500 may include a driver application comprising a page component 502 that may host gray micro-application 508 and red micro-application 516. The driver application may also include an event hub 504 and state store 506. Gray micro-application 508 may include a front end interface depicting three buttons: red button 510, blue button 512, and purple button 514. At step 518, gray micro-application 508 may trigger or detect an event (i.e. "red" event) as a result of a user interaction with red button 510. Gray micro-application 508 may transmit event information (containing a value) relating to the interaction with red button 510 (i.e., "red" event information) to event hub 504. Event hub 504 may be configured to route event information based on one or more criteria, as described above. Event hub 504 may determine that red micro-application 516, at step 520, is subscribed to listen for event information belonging to a category, such as red events. Event hub 504 may then route the red event information to red micro-application 516 based on the determination. In this way, a subscribing micro-application may receive event information originating from gray micro-application 508.

Figure 6:
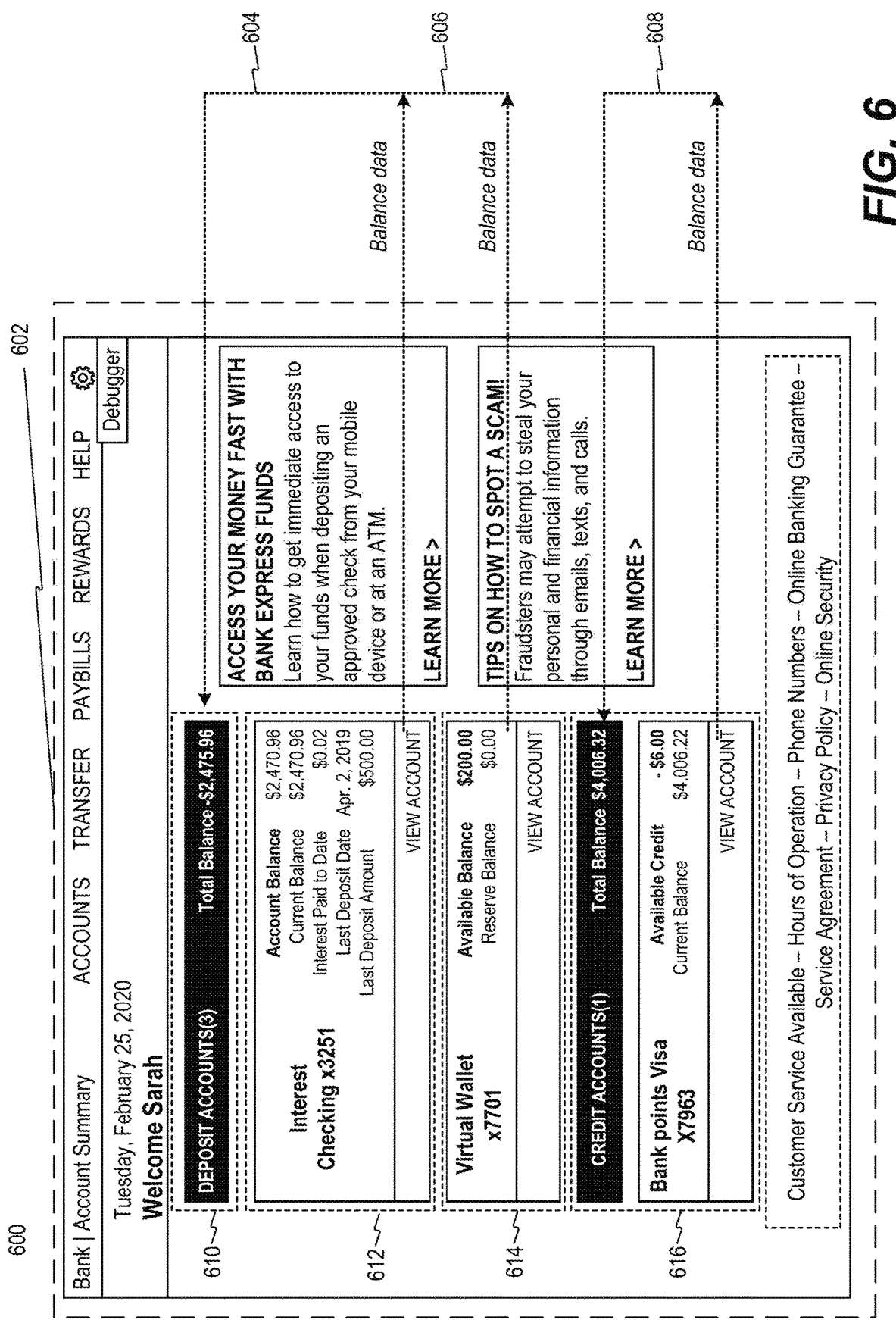
FIG. 6 is a schematic representation of an exemplary digital experience application enabling micro-applications to share information according to embodiments of the present disclosure.

FIG. 6 is a schematic representation of an exemplary digital experience application enabling micro-applications to share information according to embodiments of the present disclosure. Digital experience application 600 may provide a user with a digital experience relating to an application, such as, for example, a financial application for accessing a bank account. Application 600 may include a driver application 602 configured to host and manage the micro-applications relating to the user's bank account. The micro-applications may individually satisfy different business functions relating to the user's bank account. For example, driver application 602 may host micro-application 616 configured to provide a deposit account total balance; micro-application 612 configured to provide deposit account summary information; micro-application 614 configured to provide virtual wallet account summary information; and micro-application 616 configured to provide credit card account summary. The collection of micro-applications 610, 612, 614, 616 may be configured to share information to ensure a consistent experience is delivered throughout application 600. For example, micro-applications 610, 612, 614, 616 may transmit and receive event information and state information to and from an event store and state store, as described above. As depicted in FIG. 6, individual account balance data may be shared (at steps 604, 606, 608) between micro-applications 610, 612, 614, and 616 to present a summary balance of all deposit accounts or all credit accounts.

State Store for Updating and Storing Application States

Figure 7:
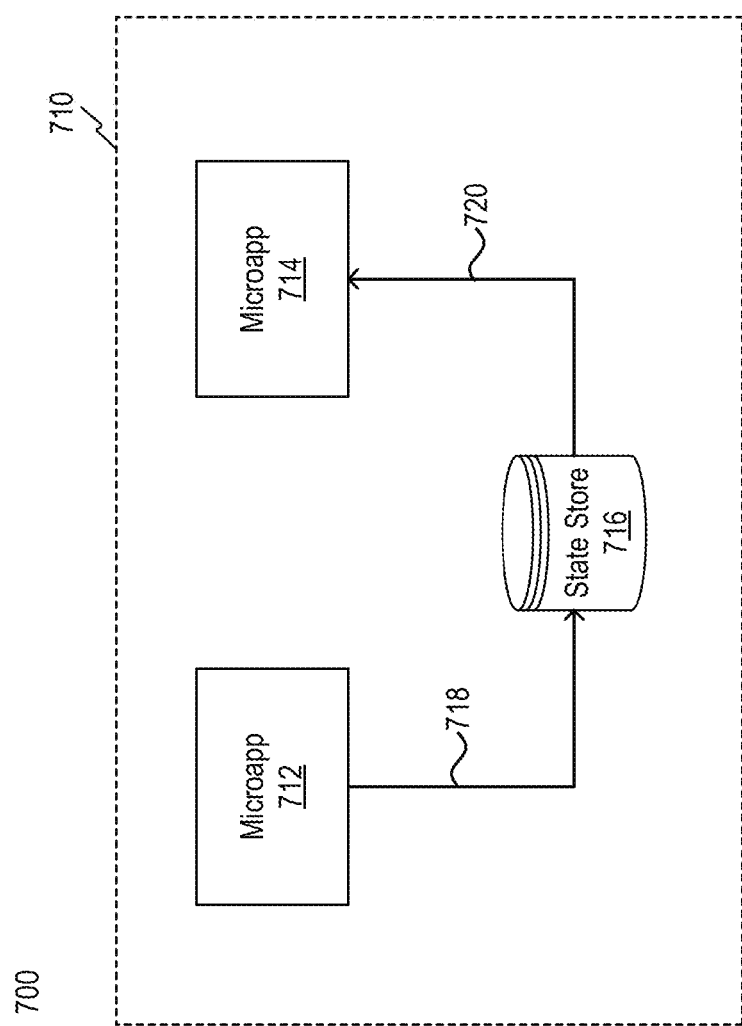
FIG. 7 is a schematic representation of an exemplary computer-implemented state store for storing state information of a digital experience application 700, according to embodiments of the present disclosure.

FIG. 7 is a schematic representation of an exemplary computer-implemented state store for storing state information of a digital experience application 700, according to embodiments of the present disclosure. Driver application 710 may include a first micro-application 712, a second micro-application 714, and a state store 716. The state store 716 may be configured to route state information based on one or more criteria. For example, the criteria may relate to subscriptions, a category of information, or a source of information. As depicted in FIG. 7, micro-application 712 may send state information at step 718 to the state store 716. The state information may be sent as a result of a user interaction or background processes. The state information may belong to a category. For example, the state information may belong to a category relating to account deposits. At step 718, micro-application 712 may update the state belonging to the deposit category and send the updated state information to state store 716 for storage. State store 716 may comprise a database, server, local storage, in-browser memory, or other memory structures for storing state information.

In a similar fashion as with event hub, the state store 716 may be configured to send the state information to micro-applications that have subscribed to indicate they wish to receive state information belonging to a specific category. State store 716 may determine that micro-application 714 is subscribed to listen to state information, such as state changes, belonging to the deposit category. For example, state store 716 may consult a data storage component, such as a lookup table or other memory structure, to determine whether subscriptions exist. Alternatively or additionally, state store 716 may determine that micro-application 714 is subscribed to receive state changes transmitted from a particular source, such as micro-application 712. State store 716 then routes the state information received from micro-application 712 to micro-application 714. In some instances, state store 716 may route the state information based on a source identification value emitted by micro-application 712. For example, state store 716 may determine that micro-application 712 is subscribed to state changes provided by micro-application 712. Here, state store 716 routes the state information to micro-application 714 using the source identification value emitted by micro-application 712.

Dynamic Loading of Micro-Applications

Figure 8:
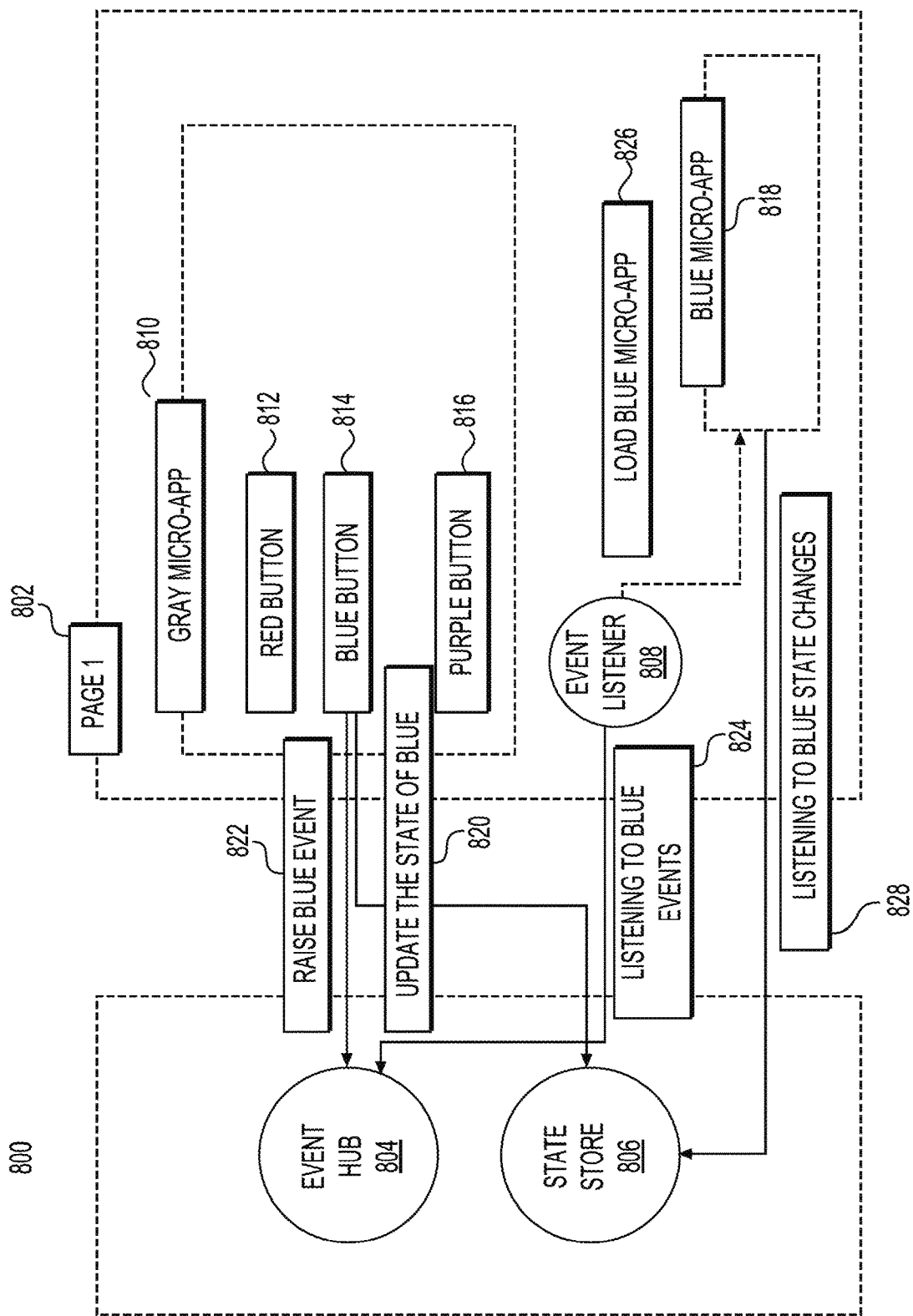
FIG. 8 is a schematic representation of an exemplary method for dynamically loading a micro-application according to embodiments of the present disclosure.

FIG. 8 is a schematic representation of an exemplary method for dynamically loading a micro-application, according to embodiments of the present disclosure. Here, an event hub and state store may enable communication with a first micro-application to dynamically load a second micro-application. Application 800 may include a driver application hosting gray micro-application 810 and blue micro-application 818 within a page component 802. In some embodiments, driver application may load gray micro-application 810 such that it is accessible within application 800, without loading blue micro-application 818. Driver application may also include an event hub 804, state store 806, and event listener 808. Gray micro-application 810 may include a front end interface depicting three buttons: red button 812, blue button 814, and purple button 816.

As an exemplary first step 820, gray micro-application 810 may trigger or detect a state change belonging to a category, for example a "blue" category. The state change may be triggered or detected as a result of a user interaction with blue button 814 or alternatively, as a result of a background process related to blue button 814. Gray micro-application 810 may transmit state information (containing a value) relating to the interaction with blue button 814 (i.e., "blue" state information) to state store 806. State store 806 may be configured to store the blue state information and/or update previously stored blue state information. At step 822, gray micro-application 810 may trigger or detect an event associated with the state change (i.e. a "blue" event) as a result of the user interaction with blue button 814. Gray micro-application 810 may transmit event information, containing a value (i.e., "blue" event information) associated with the state change to event hub 804. Event listener 808 may be configured to listen for events belonging to a category, such as blue events. Event listener 808 may be subscribed to receiving event information belonging to the category of blue events. Event hub 804 may determine that event listener 808 is subscribed to listen for event information belonging to a category of blue events. At step 824, event hub 804 may then route the blue event information to event listener 808 based on the determination.

Event listener 808 may be configured to respond or perform an action based on receiving the blue event information from event hub 804. For example, at step 826, event listener 808 may communicate with driver application to generate or load blue micro-application 818. Blue micro-application 818 may be configured to listen to state changes belonging to a category. At step 828, state store 806 may determine that blue micro-application 818 is subscribed to listen for state information belonging to the blue category, such as blue state changes. State store 806 may then route the stored blue state information to blue micro-application 818. In this way, newly-loaded blue micro-application 818 is updated with the latest blue state information.

Navigation Between Page Components

Figure 9:
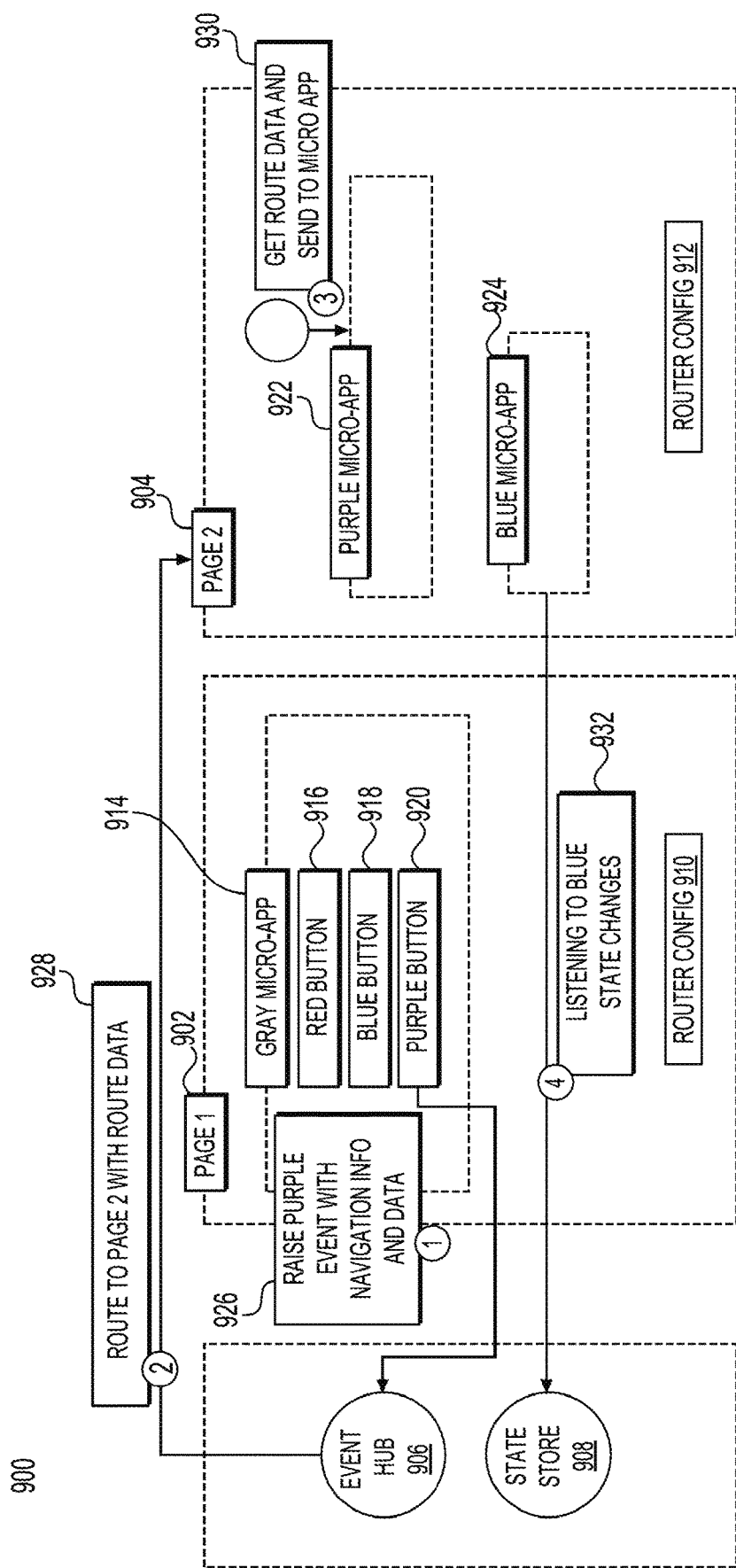
FIG. 9 is a schematic representation of an exemplary method for navigating between page components.

FIG. 9 is a schematic representation of an exemplary method for navigating from one page component to another page component, consistent with embodiments of the present disclosure. In some embodiments, page component may be responsible for handling navigation between pages. In some embodiments, an application may include multiple page components, wherein some page components are visible to the user while other page components are not visible to the user. Here, the user may navigate from one page component (for example, a visible page component) to another page component that was previously hidden from view. As depicted in FIG. 9, application 900 may include a driver application comprising a first page component 902 including gray micro-application 914. Gray micro-application may include a front end interface depicting three buttons: red button 916, blue button 918, and purple button 920. Page component 902 may also include router configuration information 910 so that page component 902 may be configured to act as a route in the driver application. Driver application may comprise a second page component 904 including purple micro-application 922 and blue micro-application 924. Page component 904 may also include router configuration information 912. Driver application may also comprise an event hub 906 and state store 908.

Gray micro-application 914 may trigger or detect an event (e.g., a "purple" event) as a result of a user interaction with purple button 920 or alternatively, as a result of a background process related to purple button 920. At step 926, gray micro-application 914 may transmit event information, containing a value, relating to a category to event hub 906. For example, gray micro-application 914 may transmit purple event information relating to the interaction with purple button 920 to event hub 906. In addition to purple event information, gray micro-application 914 may transmit navigation information to event hub 906 relating to the purple event. In some instances, the navigation information may be retrieved from router configuration information 910. Event hub 906 may be configured to route event information based on one or more criteria, as described above. At step 928, event hub 906 may route purple event information to a second page component 904 based on the navigation information. At step 930, page component 904 may receive purple event information and transmit it to purple micro-application 922 based on the navigation information. For example, purple micro-application 922 may be subscribed to receiving events belonging to the purple category or events belonging to a source such as gray micro-application 914. In some instances, router configuration information 912 may receive or store the navigation information received.

At step 924, blue micro-application 924 within second page component 904 may, as a result of the purple event information, receive state information from state store 908. For example, blue micro-application 924 may be subscribed to listen to state information belonging to a blue category (i.e. blue state information). As a result of the purple event information received at purple micro-application 922, state store 908 may be configured to transmit updated blue state information to blue micro-application 924.

Developer Utility and Tool Kit

Figure 10:
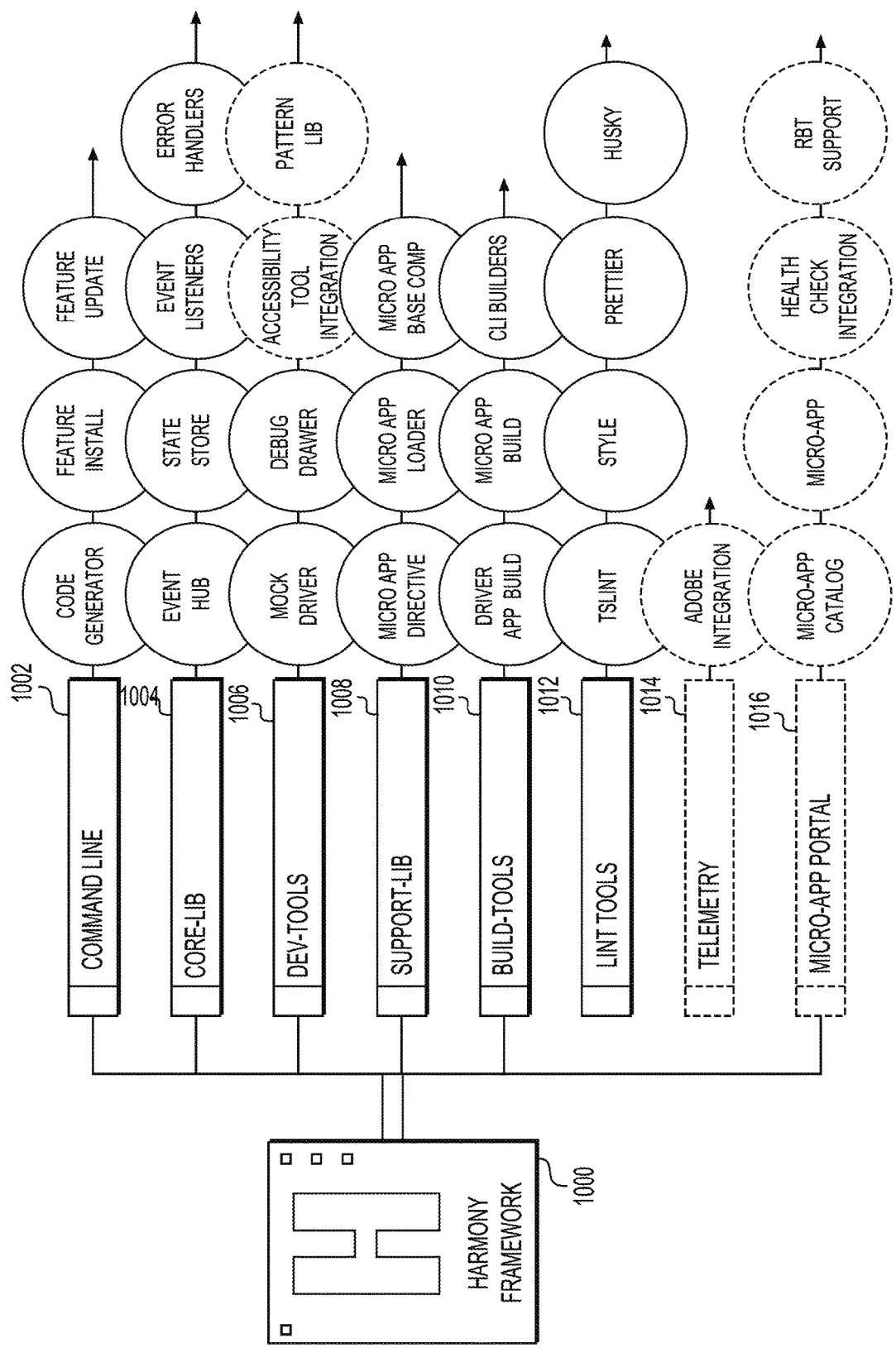
FIG. 10 is a schematic representation of a computer-implemented system for developing digital experience applications according to embodiments of the present disclosure.

FIG. 10 is a schematic representation of a computer-implemented system for developing digital experience applications, according to embodiments of the present disclosure. Framework 1000 provides developers with a common user interface framework enabling development of consistent and standard digital experience applications. Framework 1000 may provide developers with the toolkit, components, and libraries to ensure proper automated testing, debug and build patterns. For example, framework 1000 ensures applications may be built to architecturally-approved standards. Framework 1000 provides benefits over prior frameworks, as the framework enables scaffolding based on conventions, code standardization, reinforces best practices and code quality through linting rules, provides an enhanced developer experience, enables a custom build process to optimize a bundle size based on local or production deployment, and standardizes the communication pattern through the use of an event hub and a state store.

Framework 1000 may comprise a command line interface (CLI) 1002, a core library 1004, developer tools 1006, support library 1008, build tools 1010, lint tools 1012, telemetry 1014, and micro-application portal 1016. CLI 1002 is a command line tool for managing development of an application. CLI 1002 may comprise commands for generating, installing, and updating features. An example of CLI 1002 is illustrated in FIG. 11.

Figure 11:
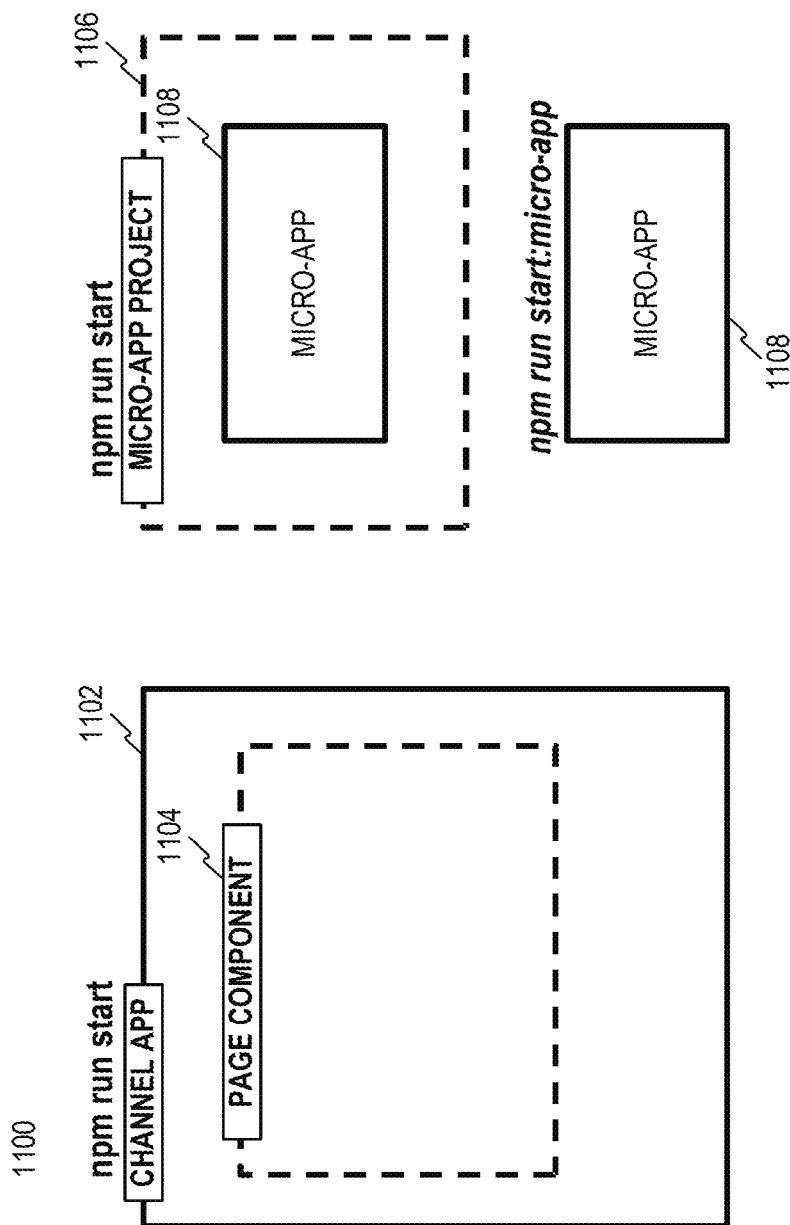
FIG. 11 is a schematic representation of an exemplary command line interface according to embodiments of the present disclosure.

FIG. 11 is a schematic representation of an exemplary command line interface, such as CLI 1002. CLI 1100 provides a developer-friendly utility for enforcing consistency and standardization during the development process. The framework enables developers to visualize the driver application and micro-application interactions. The framework provides functions for creating a new application, for example, by providing a developer the ability to perform the following functions: create a driver application, such as driver application 1102; create a new micro-application 1108 using the micro-application project 1106; build and serve the micro-application 1108; create a page component such as page component 1104 within driver application 1102; and append the new micro-application 1108 to the driver application 1102.

Returning to FIG. 10, core library 1004 may comprise a library to create an event hub, a state store, an event listener, an error handler, and other components of a driver application. Developer tools 1006 may comprise a mock driver to be used as a test container, a debug drawer to capture and replay events as part of communications of a micro-application, accessibility tool integration, a pattern library, or the like. Support library 1008 may comprise a library to provide easy access to life cycle methods of micro-applications, destroy and clean up micro-applications after use, generate error templates, generate load cursors, or the like. Support library 1008 may provide common functionalities and best practices to be followed by a developer. Support library 1008 may also comprise a library to eager or lazy load micro-applications. For example, lazy loading is a process for speeding up application load time by splitting the application into multiple bundles and loading them on demand (i.e. at run time). In this way, dependencies may be lazy loaded on an as-needed basis rather than eager-loaded, which requires the dependencies or components be loaded on launch.

Build tools 1010 may comprise tools to build a driver application, create a page component, create a micro application, append a micro-application to a page component, for example. Lint tools 1012 may comprise tools enabling automatically integrating standard rules and best practices for the programming language being used and other programming information such as TSLint, Stylelint, Prettier, Husky, or the like. Telemetry 1014 may comprise integration such as Adobe integration. Micro-application portal 1016 may comprise a micro-application catalog, micro-application preview, health check integration, RBT support, or the like. In some embodiments, libraries may be externalized so that they may be changed without impacting the development of micro-applications.

Figure 12:
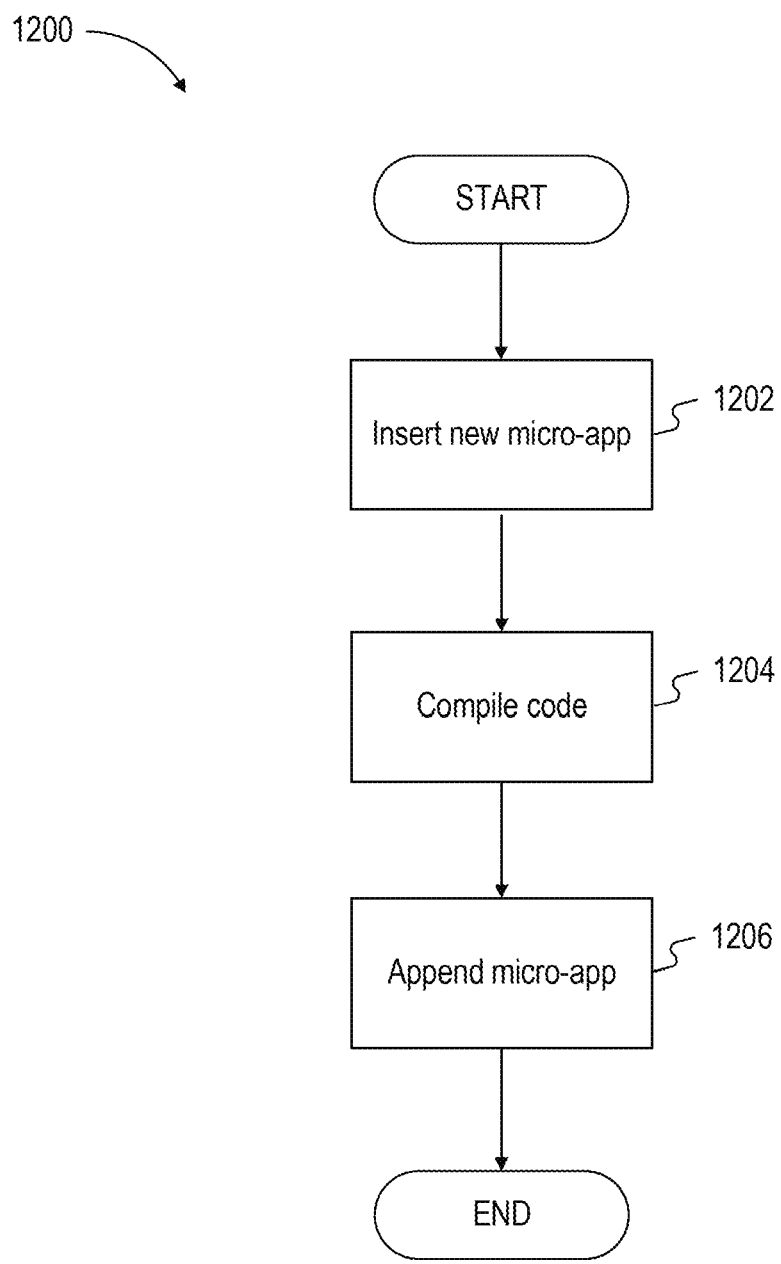
FIG. 12 is an exemplary method of creating a micro-application using a developer utility according to embodiments of the present disclosure.

FIG. 12 is an exemplary method of creating a micro-application using a developer utility, according to embodiments of the present disclosure. The developer utility enables a developer to build, test, and deploy (i.e., insert) new micro-applications within a driver application. Method 1200 begins at step 1202. Step 1202 may include performing a "new" CLI command to insert a new micro-application into a digital experience application. For example, a new micro-application may be inserted into a mock driver application to develop the new micro-application with context. Step 1204 may include performing a "build" command to compile code belonging to the micro-application. This may ensure that no errors exist between the new micro-application and the digital experience application. Step 1206 may include performing an "append" command to append the micro-application to the digital experience application.

Figure 13:
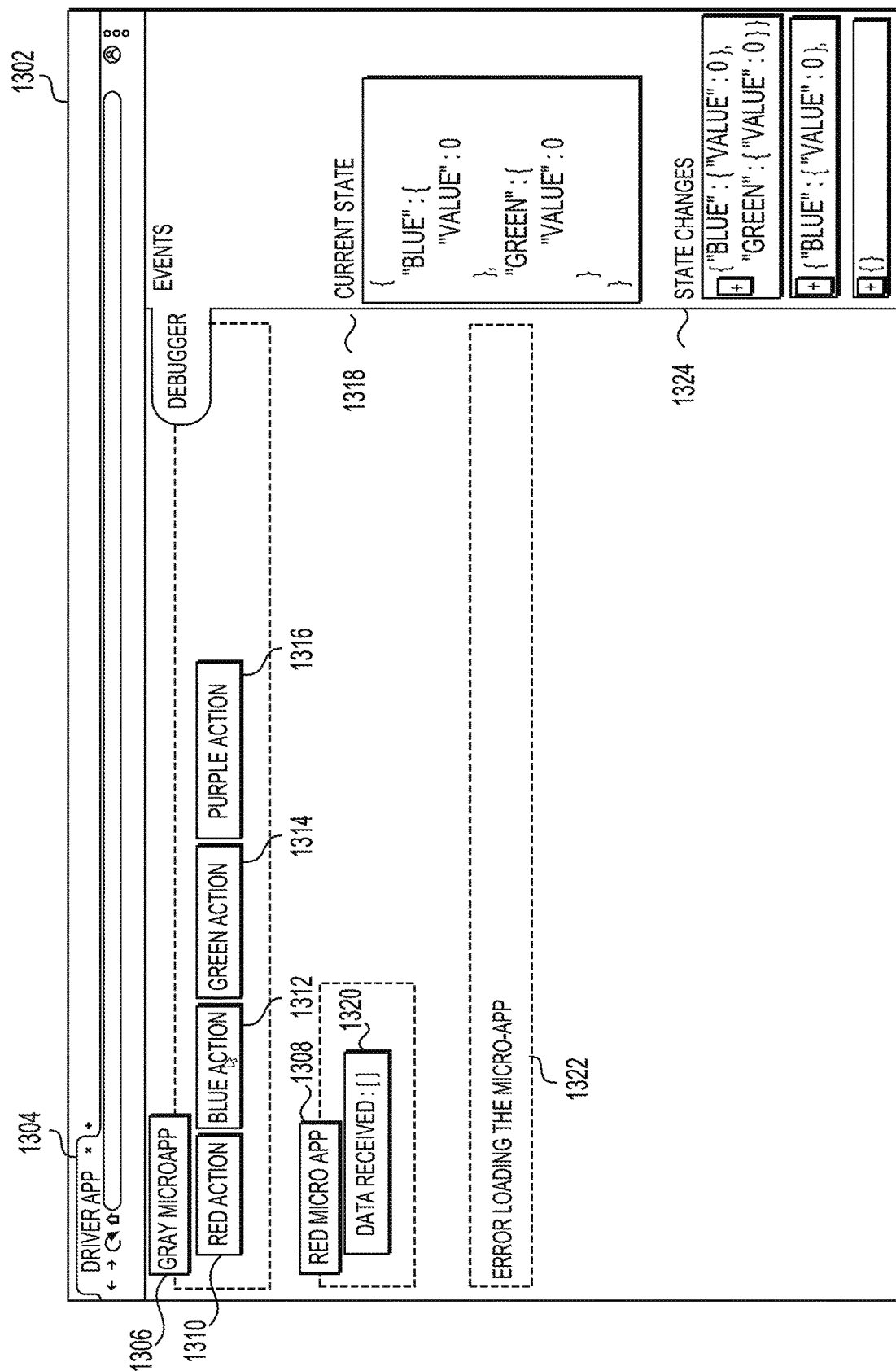
FIG. 13 is a schematic representation of an exemplary computer-implemented developer utility for developing digital experience applications according to embodiments of the present disclosure.

FIG. 13 is a schematic representation of an exemplary computer-implemented developer utility for developing digital experience applications, according to embodiments of the present disclosure. In one embodiment, the developer utility 1302 may comprise a series of functions to create, manage, and debug micro-applications, such as gray micro-application 1306 and red micro-application 1308. For example, a developer utility may comprise the commands and libraries mentioned above in connection with FIG. 10.

In another embodiment, the developer utility may comprise a user interface. The user interface may comprise one or more fields for displaying generated micro-applications. A generated micro-application, such as gray micro-application 1306, may be configured to display an action that may be configured to trigger an application event when a developer interacts with it, such as red action 1310, blue action 1312, green action 1314, and purple action 1316. A generated micro-application may be further configured to display data received as a result of an application event, such as such as red micro-application 1308 displaying data received 1320 as a result of red action 1310. The user interface may further comprise an error field 1322 that may be configured to display errors resulting from executing the application; an event field that may be configured to display previous application events; a current state field 1318 that may be configured to display current state information of the application; and an event changes field 1324 that may be configured to display changes in the state of the application. It is to be understood that the user interface may contain more or less fields than those indicated above.

In another embodiment, the developer utility may comprise one or more utilities integrated into the application development process. For example, as described above, micro-applications may be configured to contain a debug drawer to be able to capture and replay events as a part of the micro-application communication. Furthermore, the developer utility may comprise one or more of the following: automatic code formatting to format code into a uniform format for a more elegant and easy-to-read code; integrated linting techniques to automatically integrate standard rules and best practices for the programming language being used (e.g., TypeScript) and other programming information (e.g., stylesheets); pre-committing hooks to automatically integrate standard rules and best practices before a developer shares his or her code (e.g., by pushing the code to a Bitbucket or GitHub repository); test integration to automatically integrate testing units during the build process to ensure that the application functions properly after new code is added; a customizable build process to change the building process depending on the needs (e.g., development vs. production deployment); a micro-application project configured to able to have a separate folder for micro-application related components; and a root level component configured to be used as a mock driver-application container.

Figure 14:
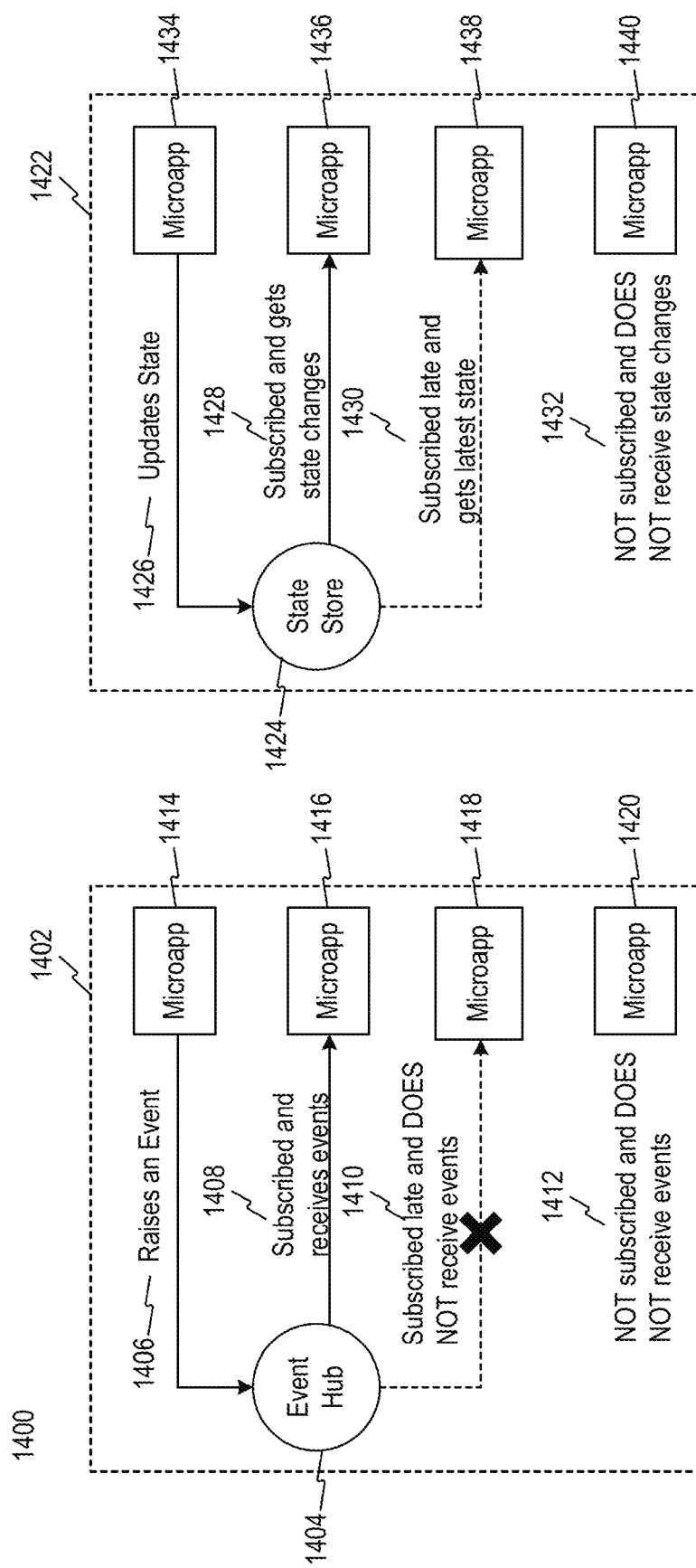
FIG. 14 is an exemplary developer utility according to embodiments of the present disclosure.

FIG. 14 is an exemplary developer utility, according to embodiments of the present disclosure. A developer utility, such as a debugger 1400, may be configured to display event information and state information being exchanged between micro-applications. This utility enables visualizing the interactions between states, events, and micro-applications and their components, allowing a developer to quickly validate micro-application functionality and behavior.

Debugger 1400 enables a developer to visualize an event hub 1404 within a driver application. In some embodiments, debugger 1400 enables the developer to review how event hub 1404 interacts with micro-applications 1414, 1416, 1418, and 1420. For example, debugger enables the developer to visualize the logical flow of steps. At 1406 micro-application 1414 raises an event belonging to a category. Event information relating to the event is sent to event hub 1404. At step 1408, a determination that micro-application 1416 is subscribed to receive events relating to the category (or alternatively relating to micro-application 1414) causes micro-application 1416 to receive the raised event. At step 1410, a determination that micro-application 1418 is subscribed to receive events relating to the category, but that the subscription occurred late, causes micro-application 1418 to not receive the raised event. At step 1412, a determination that micro-application 1420 is not subscribed to receive events belonging to the category causes micro-application 1420 to not receive the raised event.

Similarly, debugger 1400 enables a developer to visualize state store 1424 within a driver application. In some embodiments, debugger 1400 enables the developer to review how state store 1424 interacts with micro-applications 1434, 1436, 1438, and 1440. For example, debugger enables the developer to visualize the logical flow of steps. At 1426 micro-application 1434 detects an updated state belonging to a category. State change information is sent to state store 1424 for storage. At step 1428, a determination that micro-application 1436 is subscribed to receive state change information relating to the category (or alternatively relating to micro-application 1434) causes micro-application 1436 to receive the change information. At step 1430, a determination that micro-application 1438 is subscribed to receive state change information relating to the category, but that the subscription occurred late, causes micro-application 1438 to not receive the state change information. At step 1432, a determination that micro-application 1440 is not subscribed to receive events belonging to the category causes micro-application 1440 to not receive the state change information.

Figure 15:
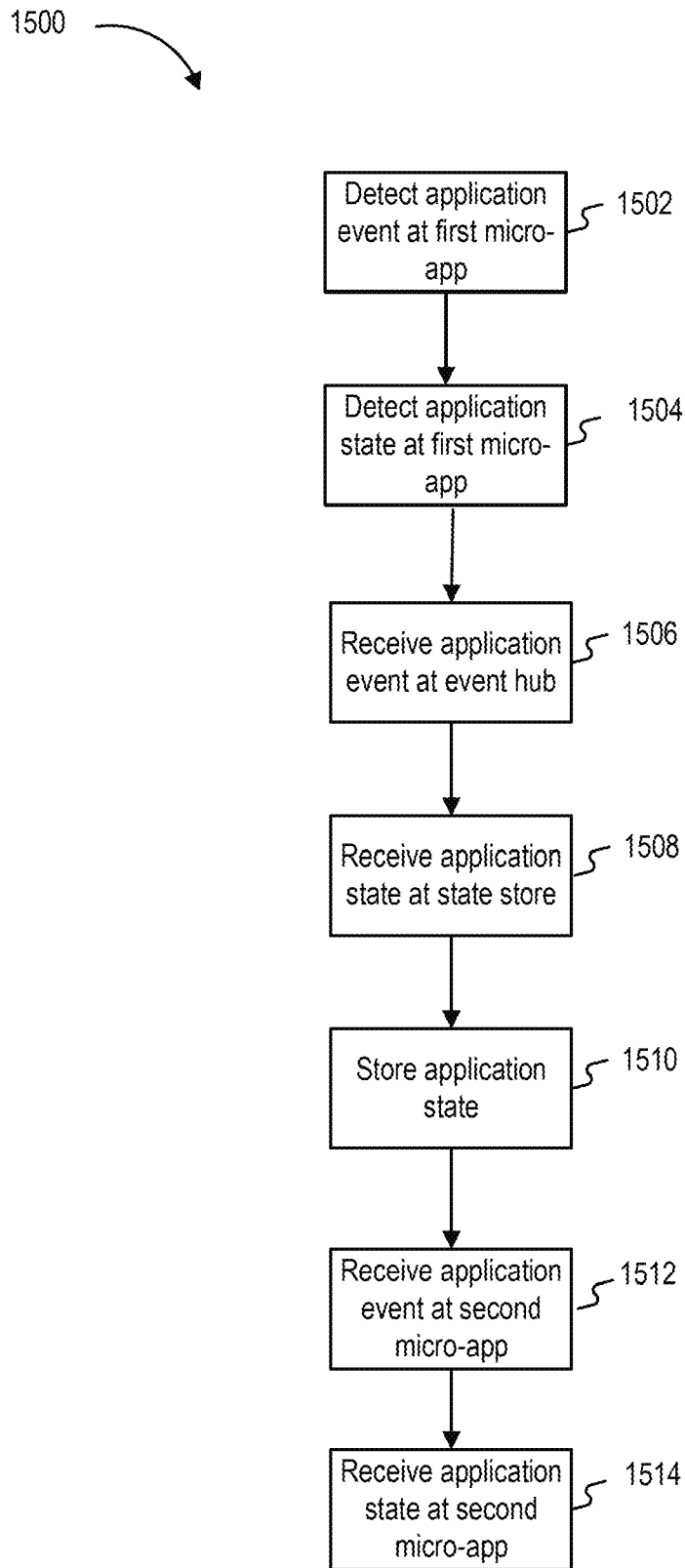
FIG. 15 is a flowchart of an exemplary computer-implemented method for providing a digital experience through an application in accordance with some embodiments.

FIG. 15 is a flowchart of an exemplary computer-implemented method 1500 for providing a digital experience through an application in accordance with some embodiments. Method 1500 may comprise step 1502 of detecting, at an event manager of a first micro-application, an application event belonging to a category. Method 1500 may comprise step 1504 of detecting, at a state manager of the first micro-application, an application state belonging to the category. Method 1500 may comprise step 1506 of receiving, at an event hub, the detected application event from the event manager of the first micro-application. Method 1500 may comprise step 1508 of receiving, at a state store, the detected application state from the state manager of the first micro-application. Method 1500 may comprise step 1510 of storing, at the state store, the detected application state. Method 1500 may comprise step 1512 of receiving, at an event manager of a second micro-application, the detected application event from the event hub. Method 1500 may comprise step 1514 of receiving, at a state manager of the second micro-application, the detected application state from the state store.

The present disclosure has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

According to some embodiments, the operations, techniques, and/or components described herein can be implemented by a device or system, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that can incorporate hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems can control and schedule computer processes for execution, perform memory management, provide file system, networking, I/O services, and provide a user interface functionality, such as a graphical user interface ("GUI"), among other things.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

It is intended, therefore, that the specification and examples be considered as example only, with a true scope and spirit being indicated by the following claims and their full scope of equivalents.

What is claimed is:

1. A system for providing a digital experience, the system comprising:

at least one processor in communication with a memory device, the memory device storing instructions which, when executed, cause the at least one processor to perform instructions for:

executing a first micro-application and a second micro-application, each micro-application comprising a front end interface that receives and displays information, wherein the first micro-application comprises:

a first micro-application event manager that detects a first application event belonging to a first category; and a first micro-application state manager that detects a first application state belonging to the first category; and executing a driver application that hosts the first and the second micro-applications;

operating as an event hub that:

receives the first detected application event from the first micro-application, determines that the second micro-application is subscribed to receive the first detected application event;

determines whether to transmit the first detected application event to the second micro-application based on the subscription; and transmits the first detected application event to a second micro-application event manager of the second micro-application; and operating as a state store that:
receives the first detected application state from the first micro-application;
determines that the second micro-application is subscribed to receive the first detected application state;
determines whether to transmit the first detected application state to the second micro-application based on the subscription; and
transmits the first detected application state to a second micro-application state manager of the second micro-application.

2. The system of claim 1, wherein the first detected application event is transmitted by the event hub in response to a user interaction with the front end interface of the first micro-application.

3. The system of claim 1, wherein:
the system performs a background process; and
the first detected application event is transmitted by the event hub in response to the background process.

4. The system of claim 1, wherein:
the event hub determines whether the second micro-application subscribed to receive the first application event before the first micro-application event manager detected the first application event; and
the event hub transmits the detected first application event to the second micro-application if the second micro-application subscribed before the first micro-application event manager detected the first application event.

5. The system of claim 1, wherein:
the first detected application event includes a source identifier identifying the first micro-application;
the event hub determines whether the second micro-application is subscribed to receive an application event transmitted from the first micro-application; and
the event hub transmits the first detected application event to the second micro-application event manager based on the source identifier.

6. The system of claim 1, wherein the driver application hosts a third micro-application.

7. The system of claim 6, wherein the second micro-application event manager detects a second application event belonging to a second category.

8. The system of claim 7, wherein the event hub receives the second detected application event from the second micro-application and transmits the second detected application event.

9. The system of claim 8, wherein the event hub:
determines that the third micro-application is subscribed to receive the second detected application event belonging to the second category;
determines whether to transmit the second detected application event to the third micro-application based on the subscription; and
transmits the second detected application event to a third micro-application event manager of the third micro-application.

10. The system of claim 1, wherein the second micro-application belongs to a group of micro-applications.

11. The system of claim 10, wherein:
the first detected application event includes a source identifier identifying the first micro-application;
the event hub determines whether the group of micro-applications is subscribed to receive an application event transmitted from the first micro-application; and
the event hub transmits the first detected application event to the group of micro-applications based on the source identifier.

12. The system of claim 1, wherein the event hub consults a data storage component to determine whether a micro-application subscription exists.

13. The system of claim 1, wherein the event hub acts as a communication hub that enables the first and second micro-applications to publish events.

14. The system of claim 1, wherein the driver application further comprises:
an event listener listens for the first detected application event, receive the first detected application event from the event hub, and
transmits the first detected application event to the second micro-application.

15. The system of claim 14, wherein the event hub transmits the first detected application event to the second micro-application event manager via the event listener.

16. A computer-implemented method for providing a digital experience, the method comprising the following operations performed by at least one processor:
detecting, at an event manager of a first micro-application, a first application event belonging to a first category;
detecting, at a state manager of a first micro-application, a first application state belonging to the first category;
receiving, at an event hub, the first detected application event from the first micro-application;
determining whether a second micro-application is subscribed to receive the first detected application event belonging to the first category;
determining whether to transmit the first detected application event to the second micro-application based on the subscription; and
transmitting the first detected application event to an event manager of the second micro-application;
receiving, at a state store, the first detected application state from the first micro-application;
determining whether a second micro-application is subscribed to receive the first detected application state belonging to the first category;
determining whether to transmit the first detected application state to the second micro-application based on the subscription; and
transmitting the first detected application state to a state manager of the second micro-application.

17. The computer-implemented method of claim 16, further comprising the following operations performed by the processor:
determining whether the second micro-application belongs to a group of micro-applications;
determining whether the group of micro-applications is subscribed to receive an application event detected at the event manager of the first micro-application; and
transmitting, based on the determination of whether the group of micro-applications is subscribed to receive the application event detected at the event manager of the first micro-application, the first detected application event from the event hub to the group of micro-applications.

18. The computer-implemented method of claim 16, further comprising the following operations performed by the processor:

detecting, at the event manager of the second micro-application, a second application event belonging to a second category;

receiving, at the event hub, the second detected application event from the second micro-application;

determining whether a third micro-application is subscribed to receive the second detected application event belonging to the second category;

determining whether to transmit the second detected application event to the third micro-application based on the subscription; and transmitting the second detected application event to an event manager of the third micro-application.

19. The computer-implemented method of claim 16, further comprising the following operations performed by the processor:

listening, at an event listener, for the first detected application event;

receiving, at the event listener, the first detected application event from the event hub;

transmitting, from the event hub, the first detected application event to the event manager of the second micro-application via the event listener.

20. A tangible, non-transitory computer-readable memory device that stores a set of instructions that, when executed by at least one processor, cause the at least one processor to perform operations comprising:

detecting, at an event manager of a first micro-application, a first application event belonging to a first category;

detecting, at a state manager of a first micro-application, a first application state belonging to the first category;

receiving, at an event hub, the first detected application event from the first micro-application;

determining whether a second micro-application is subscribed to receive the first detected application event belonging to the first category;

determining whether to transmit the first detected application event to the second micro-application based on the subscription; and transmitting the first detected application event to an event manager of the second micro-application;

receiving, at a state store, the first detected application state from the first micro-application;

determining whether a second micro-application is subscribed to receive the first detected application state belonging to the first category;

determining whether to transmit the first detected application state to the second micro-application based on the subscription; and transmitting the first detected application state to a state manager of the second micro-application.

\* \* \* \* \*